US008265308B2

(12) United States Patent
Gitzinger et al.

(10) Patent No.: US 8,265,308 B2
(45) Date of Patent: Sep. 11, 2012

(54) APPARATUS INCLUDING TWO HOUSINGS AND A PIEZOELECTRIC TRANSDUCER

(75) Inventors: Thomas Gitzinger, Libertyville, IL (US); Rachid Alameh, Crystal Lake, IL (US); David Cranfill, Antioch, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1310 days.

(21) Appl. No.: 11/952,309

(22) Filed: Dec. 7, 2007

(65) Prior Publication Data

US 2009/0147973 A1    Jun. 11, 2009

(51) Int. Cl.
*H04R 25/00* (2006.01)
*H04R 1/00* (2006.01)
*G08B 6/00* (2006.01)
*H04M 1/00* (2006.01)

(52) U.S. Cl. ......... 381/152; 381/190; 381/396; 340/7.6; 340/407.1; 340/407.2; 455/575.3

(58) Field of Classification Search ............... 381/152, 381/190, 396; 340/7.6, 407.1, 407.2; 455/575.3; 434/113–116
See application file for complete search history.

(56) References Cited

U.S. PATENT DOCUMENTS

| | | | | |
|---|---|---|---|---|
| 5,646,589 A * | 7/1997 | Murray et al. | ............ | 340/7.58 |
| 6,389,302 B1 | 5/2002 | Vance | | |
| 6,963,762 B2 | 11/2005 | Kaaresoja et al. | | |
| 7,089,793 B2 | 8/2006 | Yokoi et al. | | |
| 2005/0032559 A1 * | 2/2005 | Sudo et al. | ............ | 455/575.3 |
| 2005/0208903 A1 * | 9/2005 | Sakamoto | ............ | 455/90.3 |
| 2005/0219372 A1 * | 10/2005 | Watanabe | ............ | 348/207.99 |
| 2006/0052143 A9 * | 3/2006 | Tuovinen | ............ | 455/575.1 |
| 2006/0172706 A1 * | 8/2006 | Griffin et al. | ............ | 455/67.11 |
| 2006/0187215 A1 | 8/2006 | Rosenberg et al. | | |
| 2006/0208614 A1 * | 9/2006 | Scher et al. | ............ | 310/311 |
| 2007/0037605 A1 * | 2/2007 | Logan | ............ | 455/567 |
| 2007/0066274 A1 * | 3/2007 | Kim | ............ | 455/350 |
| 2009/0072768 A1 * | 3/2009 | Murray et al. | ............ | 318/114 |

FOREIGN PATENT DOCUMENTS

WO           9948083 A1      9/1999
WO   WO 2006093188 A1  *  9/2006

* cited by examiner

*Primary Examiner* — Mohamad Musleh
*Assistant Examiner* — Tsz Chan

(57) ABSTRACT

An apparatus (100) including two housings and a piezoelectric transducer is disclosed. The apparatus may include a first housing (110), a hinge (115) coupled to the first housing, and a second housing (140) coupled the first housing via the hinge. The first housing can have a closed position when the first housing is substantially adjacent to the second housing and the first housing can have an open position when a portion of the first housing is substantially away from the second housing. The apparatus can also include a first piezoelectric element (130) coupled to the second housing where the first piezoelectric element can be substantially in contact with the first housing when the first housing is in the closed position. The apparatus can further include a user interface (140) coupled to the second housing and a controller (150) coupled to the first piezoelectric element and the user interface. The controller can drive the first piezoelectric element to cause the first housing to vibrate against the second housing when the first housing is in the closed position. The controller can also drive the first piezoelectric element to provide tactile feedback in response to user activation of the user interface.

20 Claims, 7 Drawing Sheets

APPARATUS INCLUDING TWO HOUSINGS AND A PIEZOELECTRIC TRANSDUCER

BACKGROUND

1. Field

The present disclosure is directed to an apparatus including two housings and a piezoelectric transducer. More particularly, the present disclosure is directed to an electronic device that uses a piezoelectric transducer to vibrate a first housing against a second housing.

2. Introduction

Presently, electronic communication devices are decreasing in size due to desired portability. There is a high demand for thinner portable phones, thinner portable video games, thinner laptops and other devices so users can easily carry the devices in their pockets or briefcases. Because users desire thinner devices, the internal components of the devices must be eliminated or reduced in size to decrease the overall size of the device.

Another desirable feature in electronic communication devices is a vibration feature. This vibration feature causes a device to vibrate to inform a user of an incoming communication, such as an incoming call or a text message. For example, if a user places their phone on silent and vibrate mode, the device can inform the user of an incoming call without disturbing other people around the user, such as when the user is attending a play, movie, or meeting. The vibrate mode can also inform a user of an incoming call when the user is in a noisy environment, such as at a concert, in a club, or on a subway, where the user cannot hear an audible alert from their device.

Unfortunately, vibrators can take up a relatively large amount of space in an electronic communication device. For example, the vibrator must move a relatively large amount of mass in order to have the vibration perceived by a user. The mechanism for moving the mass along with the mass itself can take up a large amount of space. This can make it difficult to reduce the size of an electronic communication device, while still providing for adequate vibration to properly inform a user of an incoming communication.

SUMMARY

An apparatus including two housings and a piezoelectric transducer is disclosed. Such an apparatus can provide for a vibrate function while reducing the size of the apparatus. The apparatus may include a first housing, a hinge coupled to the first housing, and a second housing coupled the first housing via the hinge. The first housing can have a closed position when the first housing is substantially adjacent to the second housing and the first housing can have an open position when a portion of the first housing is substantially away from the second housing. The apparatus can also include a first piezoelectric element coupled to the second housing where the first piezoelectric element can be substantially in contact with the first housing when the first housing is in the closed position. The apparatus can further include a user interface coupled to the second housing and a controller coupled to the first piezoelectric element and the user interface. The controller can drive the first piezoelectric element to cause the first housing to vibrate against the second housing when the first housing is in the closed position. The controller can also drive the first piezoelectric element to provide tactile feedback in response to user activation of the user interface.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
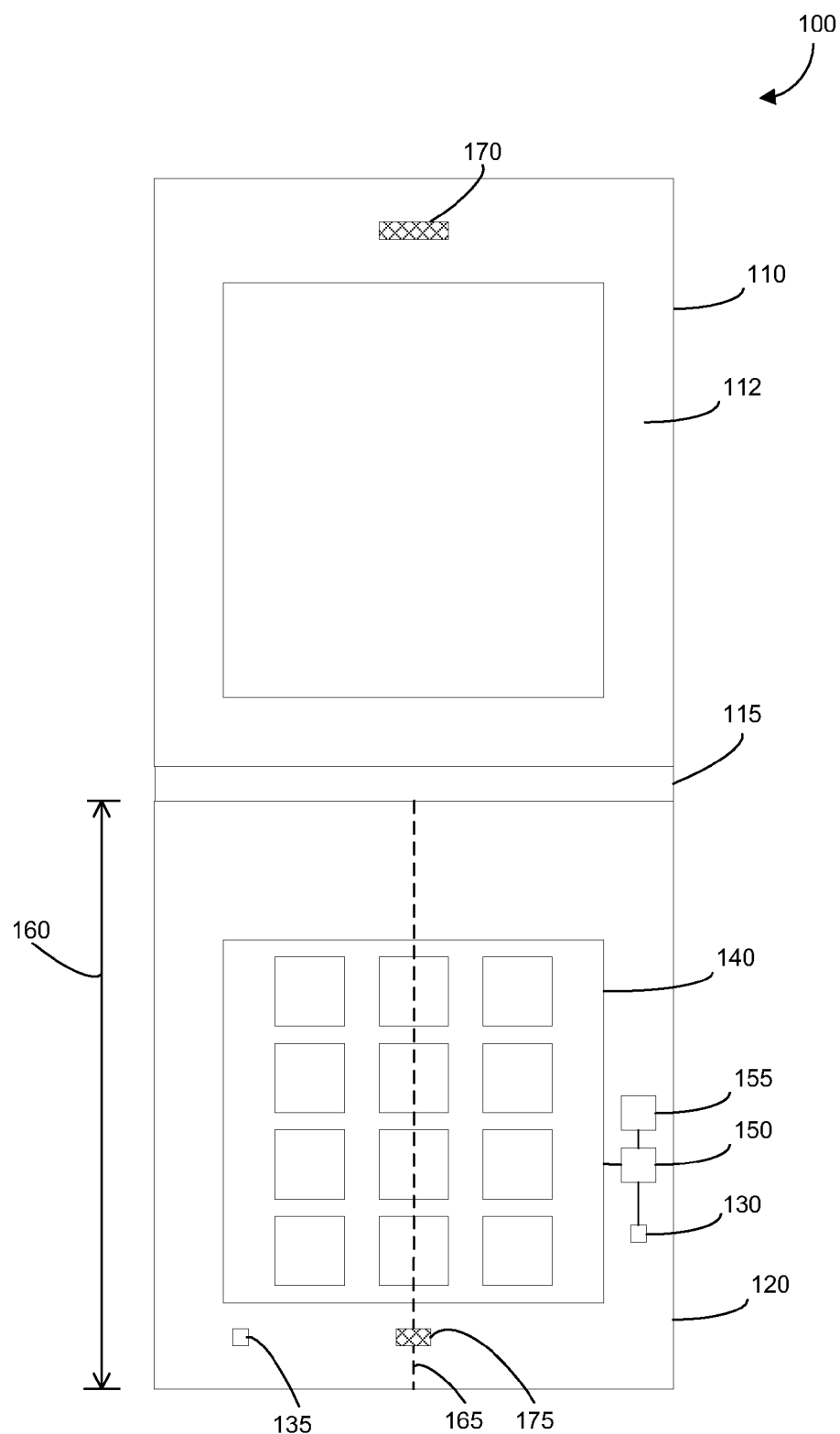
FIG. 1 is an exemplary illustration of a device according to one embodiment.

FIG. 1 is an exemplary illustration of a device 100 according to one embodiment. The device 100 may be an electronic device, such as a wireless communication device, a wireless telephone, a cellular telephone, a personal digital assistant, a pager, a personal computer, a selective call receiver, a video game controller, or any other electronic device. According to one embodiment, the device 100 can operate on a wireless telecommunications network, a cellular telephone network, a Time Division Multiple Access (TDMA) network, a Code Division Multiple Access (CDMA) network, a satellite communications network, and other communications systems.

The device 100 can include a first housing 110 having a first housing face 112, a hinge 115 coupled to the first housing 110 and a second housing 120 coupled the first housing 110 via the hinge 115. The first housing 110 can have a closed position when the first housing 110 is substantially adjacent to the second housing 120 and the first housing 110 can have an open position when a portion of the first housing 110 is substantially away from the second housing 120. The device 100 can include a first piezoelectric element 130 coupled to the second housing 120. The first piezoelectric element 130 can be substantially in contact with the first housing 110 when the first housing 110 is in the closed position. The device 100 can include a user interface 140 coupled to the second housing 120. The device 100 can also include a controller 150 coupled to the first piezoelectric element 130 and the user interface 140. The controller 150 can drive the first piezoelectric element 130 to cause the first housing 110 to vibrate against the second housing 120 when the first housing 110 is in the closed position. The controller 150 can also drive the first piezoelectric element 130 to provide tactile feedback in response to user activation of the user interface 140.

The controller 150 can also adjust a signal that drives the first piezoelectric element 130 in response to user input. The controller 150 can detect the user input by detecting a change in oscillations of the piezoelectric element 130 in response to a user squeezing the first housing 110 against the second housing 120. The change in oscillations can be a change in oscillation amplitude or change in oscillation resonant frequency. For example, the controller 150 can change an alert mode from vibrate and ring to silent in response to the user squeezing the device 100. Also, the controller 150 can choose to ignore an incoming call in response to the user squeezing the device 100.

The device 100 can also include an accelerometer 155 coupled to the controller. The accelerometer 155 can detect a change in vibration as the result of the user input. The change in vibration can be a change in vibration level or frequency. The accelerometer 155 can also detect a magnitude of vibration of the first housing 110 against the second housing 120 and the controller 150 can adjust a parameter of operation of the device 100 based on the detected magnitude of vibration. The parameter of operation may be an amplitude of a signal or a frequency of the signal driving the first piezoelectric element 130. For example, the controller 150 can increase the amplitude or change the frequency of the signal driving the first piezoelectric element 130 if the housings 110 and 120 are not vibrating at a desired magnitude, such as when the device 100 is in a user's pocket and the vibrations are suppressed. The parameter of operation may also be an alert mode, such as a vibrate mode, a ring mode, and/or a type of vibration mode, such as when the controller 150 determines the user is not touching the apparatus because the vibrations are undamped and the controller 150 can switch an alert mode to an audible alert mode or adjust a direction in which the housings 110 and 120 vibrate. The accelerometer 155 can also detect an open or closed position of the first housing 110 relative to the second housing 120 based on whether the first housing 110 vibrates with respect to the second housing 120 when the controller 150 drives the first piezoelectric element 130. For example, the accelerometer 155 can be used to detect whether the device 100 is open or closed based on whether the first housing 110 is vibrating against the second housing 120 or not.

The device 100 can also include a second piezoelectric element 135 coupled to the second housing 120 and coupled to the controller 150. The second piezoelectric element 135 can operate in conjunction with the first piezoelectric element 130 to cause the first housing 110 to vibrate when the first housing 110 is in the closed position. The second housing 120 can include a length 160 extending from the hinge 115. The first piezoelectric element 130 can be located along the length 160 at a distance from the hinge 115 different from a distance from the hinge 115 of the second piezoelectric element 135 along the length 160. The first piezoelectric element 130 can be substantially in contact with the first housing 110 via a first post when the first housing 110 is in the closed position and the second piezoelectric element 135 can be substantially in contact with the first housing 110 via a second post when the first housing 110 is in the closed position. The second housing 120 can also include a center line 165 along a length of the second housing extending from the hinge. The first piezoelectric element 130 can be located on the second housing 120 in a position offset from the center line 165 and the second piezoelectric element 135 can be located on the second housing 120 in a position offset from the center line 165. The first piezoelectric element 130 can be offset from the center line 165 at a distance different from an offset of the second piezoelectric element 135 or one or both of the piezoelectric elements 130 and 135 may be located along the center line 165. The controller 150 can drive the first piezoelectric element 130 with a signal that is out of phase with a signal that drives the second piezoelectric element 135. The controller 150 can also drive the first piezoelectric element 130 with a signal that is in phase with a signal that drives the second piezoelectric element 135 if such is adequate for vibration. For example, the piezoelectric elements 130 and 135 can be driven in and out of phase to take advantage of tight and loose tolerances on either side of the hinge 115 for off-axis vibration.

The controller 150 can drive the first piezoelectric element 130 with a first waveform that causes the first housing 110 to vibrate against the second housing 120 when the first housing 110 is in the closed position and the controller 150 can drive the first piezoelectric element 130 with a second waveform that produces a louder audible signal than the first waveform. For example, a sharktooth or other slow rise waveform can be used to vibrate the first housing 110 against the second housing 120 with a minimal audible signal and a square waveform or other faster rise waveform can be used to produce an audible click from the piezoelectric element 130.

According to a related embodiment, the piezoelectric elements 130 and 135 can be coupled to flip spacers to vibrate a flip, such as the first housing 110 against a base, such as the second housing 120, of the device 100. The space required by the piezoelectric elements 130 and 135 can be much thinner and can require a much smaller volume than traditional rotary, pancake, or linear vibrators. The base 120 and flip 110 can open and close to achieve a vibration and since the mass that is being moved is large as compared to a rotary or linear vibrator, the displacement does not have to be much. This can have an advantage over traditional vibrators in that it can take up much less volume in the device 100 and it does not have height restrictions and clearance requirements as do other vibrators. This can be a highly desirable feature in thin profile phones and other electronic devices. This can also reuse many parts of the phone, almost giving the phone a vibrator for practically nothing in terms of space and cost. The same drivers for haptics, which provide kinesthetic user feedback when using the user interface 140, can be used to drive the piezoelectric elements 130 and 135 for a vibrate mode.

In this design, like clamshell-type phones, the hinge mechanism 115 can act as a spring force holding the flip closed. Thus the flip can return to its original closed state to enable the vibration. This design can have a fundamental resonance frequency based on the mass of the device 100 and force/torsion of the hinge mechanism 115. The piezoelectric element 130 can vibrate the base 120 and flip 110 at this fundamental resonance frequency to achieve maximum efficiency. The same piezoelectric element 130 used for vibrate functionality can also be used for haptics functionality, assuming the appropriate wave forms are used.

Using a piezoelectric element 130 to drive the vibration can allow for alternative modes of vibration. The contact between the base 120 and flip 110, as well as the coupling features for vibration, can be a couple of protruding legs or posts that also act as the flip stops. The two posts can be offset from the centerline of the phone 165. Depending on how the piezoelectric elements 130 and 135 are set up, the posts can vibrate either in-phase or out-of-phase. If the piezoelectric elements 130 and 135 are driven out of phase and if the hinge 115 has a tighter tolerance on one side of the hinge and a bit looser tolerance on the second side, an off-axis vibration can be induced for a another mode of vibration. This can enable vibration along all three axes, similar to a real rotary vibrator, which can be more detectable by the user depending on how the device 100 is carried. This can also allow for switching between modes that can allow for the vibration to be more easily perceived. The wave forms driving the piezoelectric elements 130 and 135 can be changed, for example, between a sine wave and a square wave. By changing the wave form, the piezoelectric element 130 can perform similar to a typical vibrator with minimal noise or the piezoelectric element 130 can generate an audible pop in addition to the vibration. Also, the magnitude or mode of the vibration can be varied. For example, if a call goes unanswered, the magnitude of the vibration can be steadily increased or if a call goes unanswered, the vibration can switches to an audible pop.

The controller 150 can control the mode the device 100 vibrates in, such as vibrating around an axis of the hinge 115 or off-axis, as an adaptive vibrator. If the device 100 is vibrating due to an incoming call, a user can squeeze the phone and dampen the vibration, which in turn can affect the acceleration measured by the accelerometer 115. The accelerometer 155 can thus measure less vibration and this change in vibration could be sensed and used for device control such as to inform the device 100 to ignore an incoming call and/or send a caller to voice mail. The piezoelectric element 130 and accelerometer 155 combination can also be used as a flip detect. The piezoelectric element 130 can drive the base against the flip with waveforms imperceptible by the user, from a frequency, duty cycle, and spectrum points of view. The accelerometer 155 can measure these waveform pulses every so often to determine if the flip is closed.

According to another related embodiment, the device 100 can include a first housing 110, a speaker 170 coupled to the first housing 110, a hinge 115 including a cam mechanism coupled to the first housing, and a second housing 120 coupled the first housing 110 via the hinge 115. The first housing 110 can have a closed position when the first housing 110 is substantially adjacent to the second housing 120 and the first housing 110 can have an open position when a portion of the first housing 110 is substantially away from the second housing 120. The device 100 can also include a microphone 175 coupled to the second housing 120, a first piezoelectric element 130 coupled to the second housing 120, and a user interface 140 coupled to the second housing 120. The first piezoelectric element 130 can be substantially in contact with the first housing 110 when the first housing 110 is in the closed position. The device 100 can also include a controller 150 coupled to the first piezoelectric element 130 and the user interface 140. The controller 150 can drive the piezoelectric element 130 to cause the first housing 110 to vibrate against the second housing 120 when the first housing 110 is in the closed position and the controller 150 can drive the piezoelectric element 130 to provide tactile feedback in response to user activation of the user interface 140.

The controller 150 can drive the first piezoelectric element 130 with a first waveform that causes the first housing 110 to vibrate against the second housing 120 when the first housing 110 is in the closed position. The controller 150 can drive the first piezoelectric element 130 with a second waveform that has a longer wavelength that produces a louder audible signal than the first waveform.

The device 100 can also include a first post, such as a flip stop, coupled to the first piezoelectric element 130 when the first housing 110 is in the closed position, a second piezoelectric element 135 coupled to the second housing 120, and a second post coupled to the second piezoelectric element 135 when the first housing 110 is in the closed position. The controller 150 can drive the second piezoelectric element 135 in conjunction with the first piezoelectric element 130 to cause the first housing 110 to vibrate when the first housing 110 is in the closed position.

The controller 150 can detect a user input by detecting a dampening of oscillations of the first piezoelectric element 130 in response to a user squeezing the first housing 110 against the second housing 120. The controller 150 can change an alert mode by determining the dampened oscillations are the result of a user squeezing the first housing 110 against the second housing 120.

The device 100 can also include an accelerometer 155 coupled to the controller 150. The accelerometer 155 can detect a magnitude of vibration of the first housing 110 against the second housing 120. The controller 150 can adjust a parameter of operation of the device 100 based on the detected magnitude of vibration. The parameter of operation can be an amplitude of a signal driving the first piezoelectric element 130. The controller can increase the amplitude of the signal driving the first piezoelectric element 130 if the magnitude of vibration is below a threshold. The parameter of operation can also be an alert mode and the controller 150 can switch the alert mode to an audible alert mode if the magnitude of vibration is above a threshold. The controller 150 can also measure an amplitude of vibration and adjust a frequency of a signal driving the first piezoelectric element 130 to increase the amplitude of vibration. For example, a fundamental frequency of the device 100 may change and the controller 130 can adjust a drive signal frequency accordingly. The fundamental frequency may change when the device 100 is in a user's pocket, held in a holster, in a user's hand, or for any other relevant reason.

Figure 2:
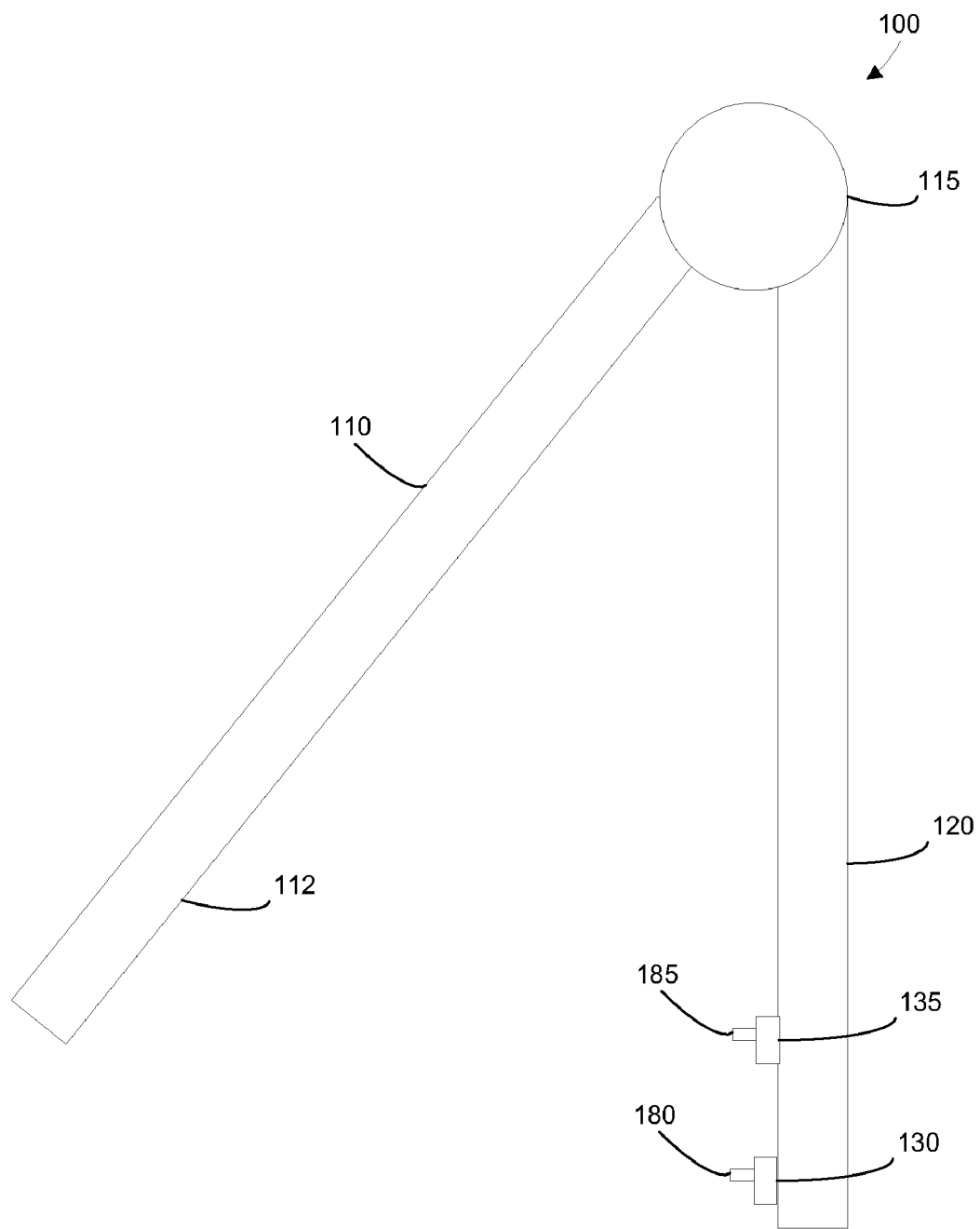
FIG. 2 is an exemplary illustration of an open position of a device according to a related embodiment.

FIG. 2 is an exemplary illustration of an open position of the device 100 according to a related embodiment. As shown, the first housing 110 can have an open position when a portion of the first housing face 112 is substantially away from the second housing 120. The device 100 may include a first post 180 and a second post 185. The first post 180 can be coupled to the first housing 110 and the first piezoelectric element 130 when the first housing 110 is in the closed position. The second post 185 can be coupled to the first housing 110 and the second piezoelectric element 135 when the first housing 110 is in the closed position. The posts 180 and 185 may be attached to the piezoelectric elements 130 and 135 in that first post 180 may be in contact with the first piezoelectric element 130 and the second post 185 may be in contact with the second piezoelectric element 185 when the first housing 110 is in the open position. Alternately, the posts 180 and 185 may be attached to the first housing 110 in that the first post 180 may be in contact with the first housing 110 and/or the second post 185 may be in contact with the first housing 110 when the first housing 110 is in the open position.

Figure 3:
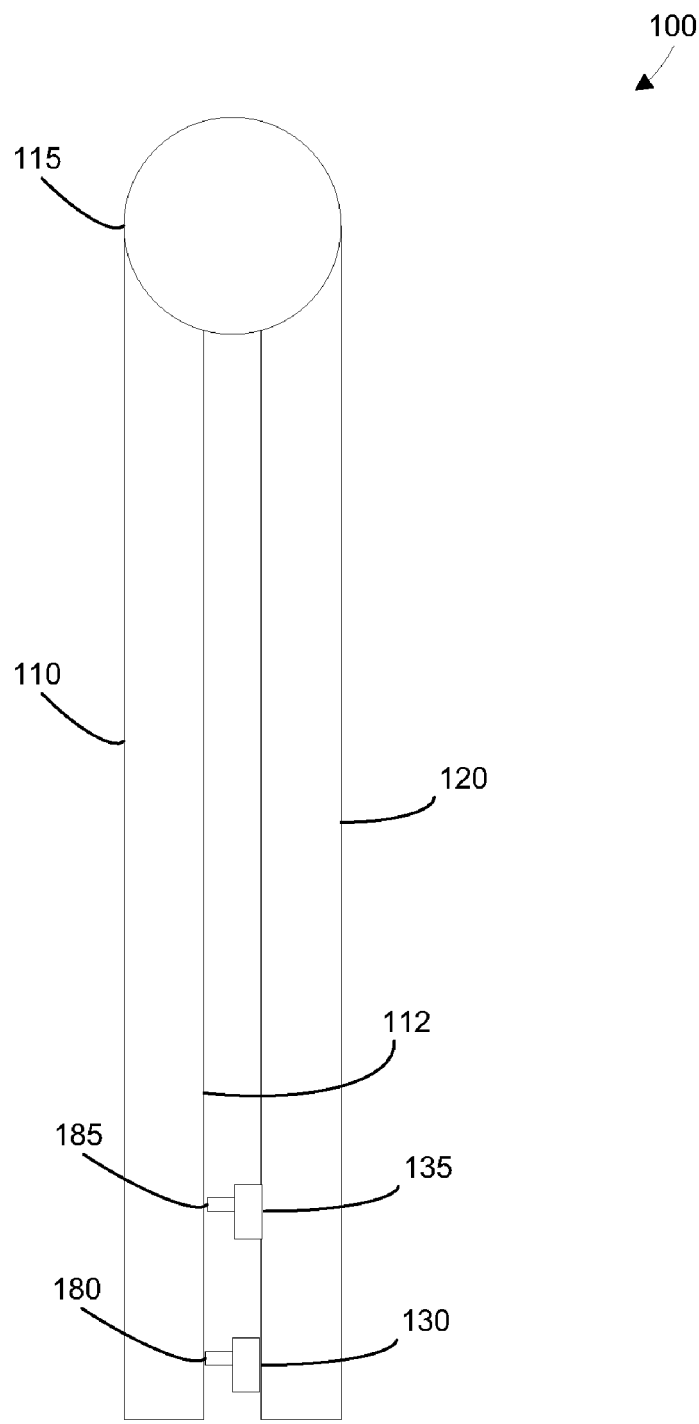
FIG. 3 is an exemplary illustration of a closed position of a device according to a related embodiment.

FIG. 3 is an exemplary illustration of a closed position of the device 100 according to a related embodiment. As shown, the first housing 110 can have a closed position when the first housing face 112 is substantially adjacent to the second housing 120. A cam mechanism in the hinge 115 can provide a force to return the first housing 110 to the closed position and press the first housing 110 at least against the piezoelectric element 130, via the post 180 if it is present. A controller can drive the second piezoelectric element 135 in conjunction with the first piezoelectric element 130 in conjunction with the posts 180 and 185 to cause the first housing 110 to vibrate when the first housing 110 is in the closed position. The relative size of the posts 180 and 185, the piezoelectric elements 130 and 135, the gap between the housings 110 and 120, and other elements may be much smaller or larger than illustrated depending on how the elements are implemented.

Figure 4:
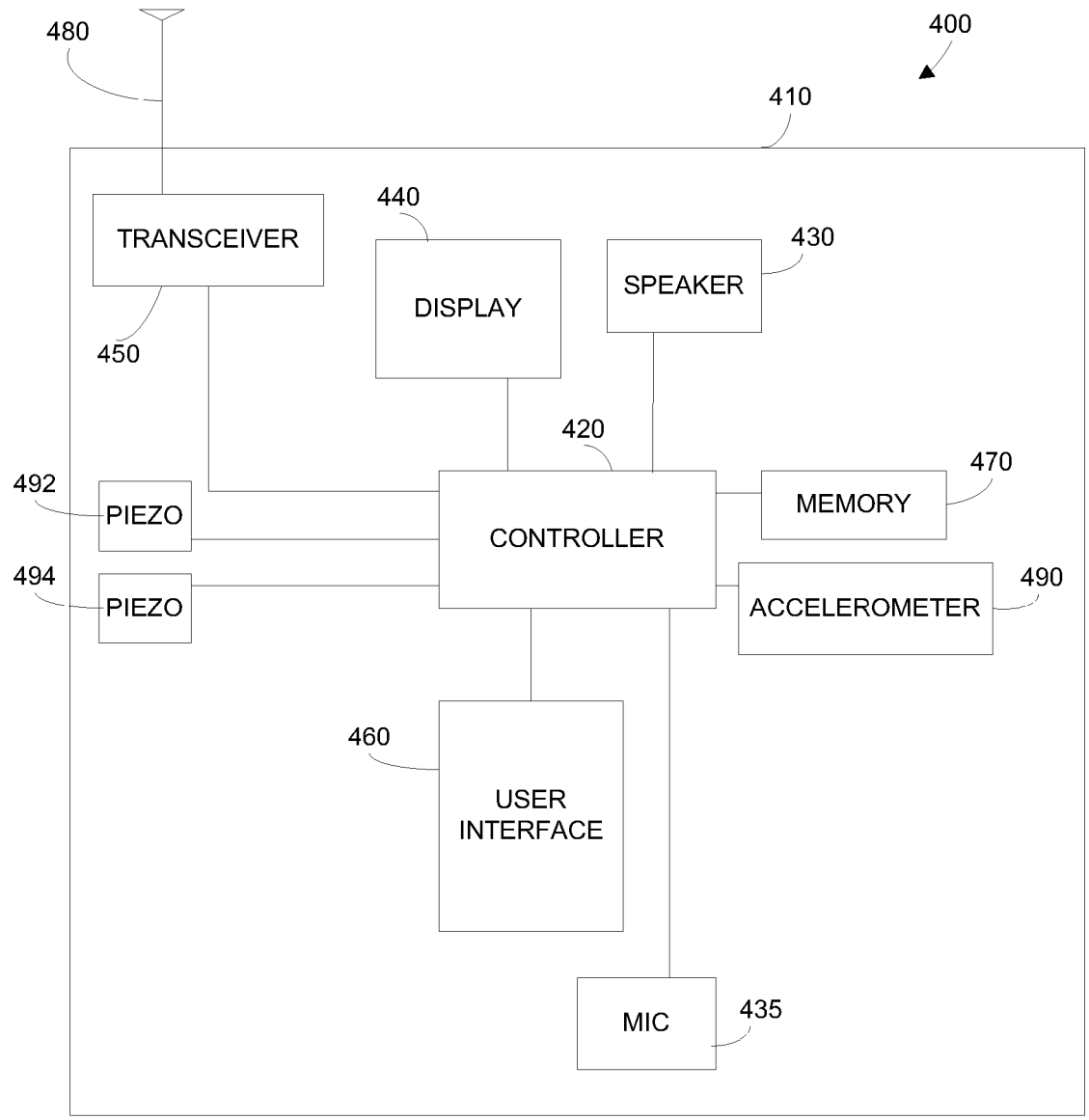
FIG. 4 is an exemplary block diagram of a wireless communication device according to another related embodiment.

FIG. 4 is an exemplary block diagram of a wireless communication device 400, such as the device 100, according to another related embodiment. The wireless communication device 400 can include a housing 410, a controller 420 coupled to the housing 410, a speaker 430 coupled to the housing 410, a microphone 435 coupled to the housing 410, a display 440 coupled to the housing 410, a transceiver 450 coupled to the housing 410, a user interface 460 coupled to the housing 410, a memory 470 coupled to the housing 410, an accelerometer 490 coupled to the housing 410 a first piezoelectric element 492 coupled to the housing 410, a second piezoelectric element 494 coupled to the housing 410, and an antenna 480 coupled to the housing 410 and the transceiver 450. The housing 410 may comprise two housings that can have an open and a closed position relative to each other and various elements of the wireless communication device 400 may be distributed on each housing depending on preferred design choice.

The display 440 can be a liquid crystal display (LCD), a light emitting diode (LED) display, a plasma display, or any other means for displaying information. The transceiver 450 may include a transmitter and/or a receiver. The user interface 460 can include a keypad, buttons, a touch pad, a joystick, an additional display, or any other device useful for providing an interface between a user and an electronic device. The memory 470 may include a random access memory, a read only memory, an optical memory, a subscriber identity module memory, or any other memory that can be coupled to a wireless communication device.

In operation, a first housing of the wireless communication device 400 can have a closed position when the first housing is substantially adjacent to a second housing of the wireless communication device 400 and the first housing can have an open position when a portion of the first housing is substantially away from the second housing. The first piezoelectric element 492 can be substantially in contact with the first housing when the first housing is in the closed position. The controller 420 can drive the first piezoelectric element 492 to cause the first housing to vibrate against the second housing when the first housing is in the closed position. The controller 420 can also drive the second piezoelectric element 494 in conjunction with the first piezoelectric element 492 to cause the first housing to vibrate when the first housing is in the closed position. The controller 420 can additionally drive the first piezoelectric element 492 to provide tactile feedback in response to user activation of the user interface 460.

Figure 5:
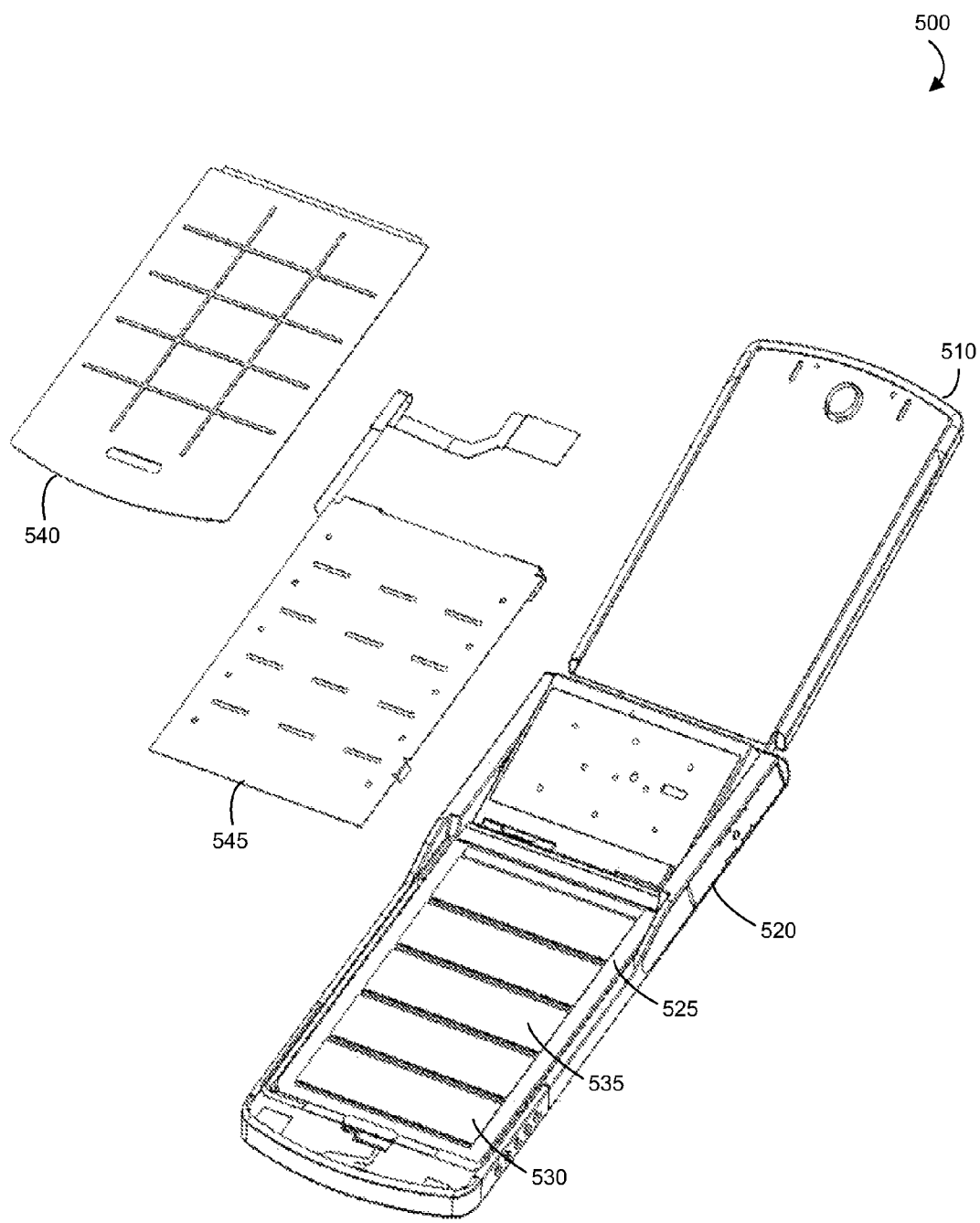
FIG. 5 is an exemplary partial exploded view of a device according to another embodiment.

FIG. 5 is an exemplary partial exploded view of a device 500 similar to the device 100 according to another embodiment. The device 500 may be an electronic device, such as a wireless communication device, a wireless telephone, a cellular telephone, a personal digital assistant, a pager, a personal computer, a selective call receiver, a video game controller, or any other electronic device. The device 500 can include a first housing 510 and a second housing 520 coupled the first housing. The first housing 510 can have a closed position when the first housing 510 is substantially adjacent to the second housing 520 and the first housing 510 can have an open position when a portion of the first housing 510 is substantially away from the second housing 520. The device 500 can include a plurality of piezoelectric elements such as a first piezoelectric element 530 and a second piezoelectric element 535 coupled to the second housing 520. For example, as shown, the device 500 can include five, or any other number of piezoelectric elements that can include beams across the width of the device 500. The piezoelectric elements can be coupled to the second housing 520 via a frame 525. The first piezoelectric element 530 and the second piezoelectric element 535 can be substantially in contact with the first housing 510 when the first housing 510 is in the closed position. The device 500 can also include a user interface 540 coupled to the second housing 520. The user interface 540 can include a flex element 545 for data entry.

Figure 6:
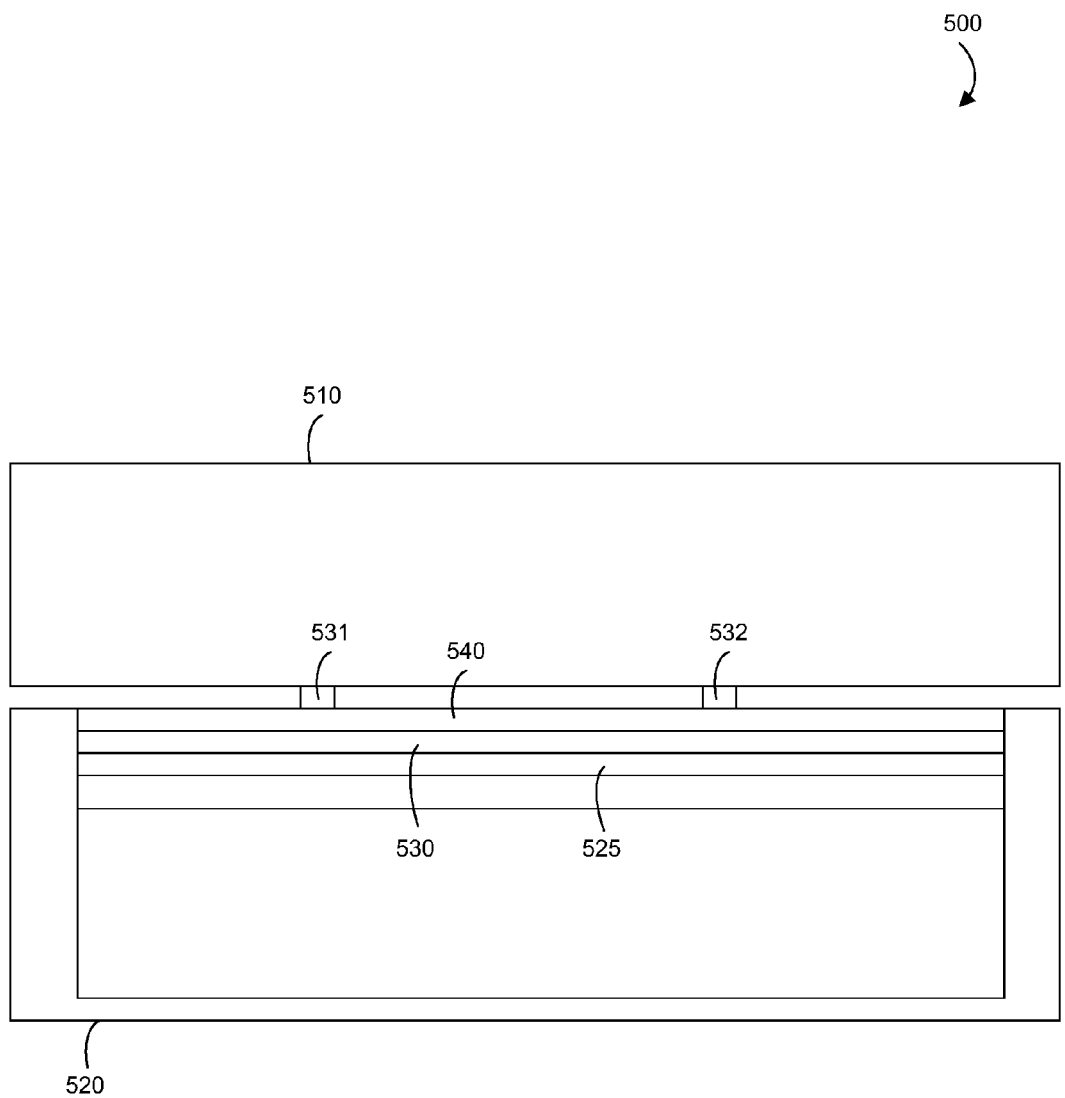
FIG. 6 is an exemplary illustration of a cross-sectional view of a device according to another related embodiment.

FIG. 6 is an exemplary illustration of a cross-sectional view of the device 500 according to another related embodiment. In a closed position, the first housing 510 can be substantially adjacent to the second housing 520 along with the user interface 540, a piezoelectric element 530 and the frame 525. The device 500 can also include keypad spacers such as posts 531 and 532 between the user interface 540 and the first housing 510. Both keypad spacers 531 and 532 can be coupled to the first piezoelectric element 530. Also, different and additional keypad spacers can be coupled to different piezoelectric elements. For example, the keypad spacer 531 can be coupled to the first piezoelectric element 530 and the keypad spacer 532 can be coupled to the second piezoelectric element 535 of FIG. 5. Thus, if a user bottoms out the first piezoelectric element 530 by squeezing the device 500, the second piezoelectric element 353 can still be used to vibrate the first housing 510.

Figure 7:
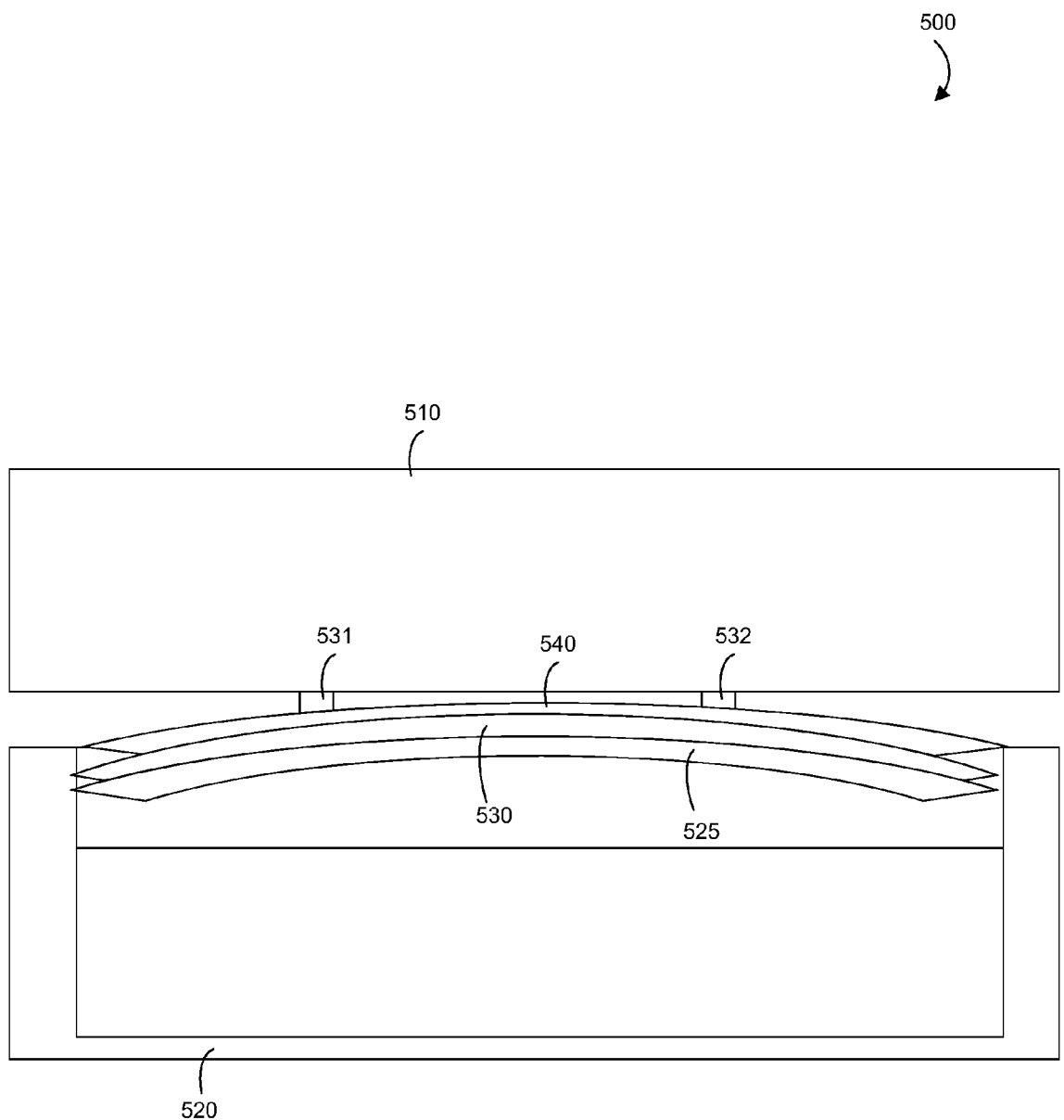
FIG. 7 is an exemplary illustration of a cross-sectional view of a device according to another related embodiment.

FIG. 7 is an exemplary illustration of a cross-sectional view of the device 500 according to another related embodiment. When the first piezoelectric element 530 is actuated, it can cause a vibration of the user interface 540 and the frame 525, which can cause the posts 531 and 532 to vibrate the first housing 510 against the second housing 520.

The procedures of this disclosure are preferably implemented on a programmed processor. However, the controllers and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine may be used to implement the functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
   a first housing;
   a hinge coupled to the first housing;
   a second housing coupled the first housing via the hinge, wherein the first housing has a closed position when the first housing is substantially adjacent to the second housing and the first housing has an open position when a portion of the first housing is substantially away from the second housing;

a first piezoelectric element coupled to the second housing, wherein the first piezoelectric element is substantially in contact with the first housing when the first housing is in the closed position;

a user interface coupled to the second housing; and a controller coupled to the first piezoelectric element and the user interface, the controller configured to drive the first piezoelectric element to cause the first housing to vibrate against the second housing when the first housing is in the closed position and the controller configured to drive the first piezoelectric element to provide tactile feedback in response to user activation of the user interface.

2. The apparatus according to claim 1, wherein the controller detects user input by detecting a change in oscillations of the first piezoelectric element in response to a user squeezing the first housing against the second housing, and wherein the controller is configured to adjust a signal that drives the first piezoelectric element in response to the user input.

3. The apparatus according to claim 1, further comprising an accelerometer coupled to the controller, the accelerometer configured to detect a change in vibration as the result of user input.

4. The apparatus according to claim 1, further comprising an accelerometer coupled to the controller, wherein the accelerometer detects a magnitude of vibration or frequency of vibration of the first housing against the second housing, wherein the controller adjusts a parameter of operation of the apparatus based on the detected magnitude of vibration or frequency of vibration.

5. The apparatus according to claim 1, further comprising an accelerometer coupled to the controller, wherein the accelerometer detects an open or closed position of the first housing relative to the second housing based on whether the first housing vibrates with respect to the second housing when the controller drives the piezoelectric element.

6. The apparatus according to claim 1, further comprising a second piezoelectric element coupled to the second housing and coupled to the controller, wherein the second piezoelectric element operates in conjunction with the first piezoelectric element to cause the first housing to vibrate when the first housing is in the closed position.

7. The apparatus according to claim 6, wherein the second housing includes a length extending from the hinge, wherein the first piezoelectric element is located along the length at a distance from the hinge different from a distance from the hinge of the second piezoelectric element along the length.

8. The apparatus according to claim 7, wherein the controller is configured to drive the first piezoelectric element with a signal that is out of phase with a signal that drives the second piezoelectric element, and wherein the controller is configured to drive the first piezoelectric element with a signal that is in phase with a signal that drives the second piezoelectric element if an in phase signal is adequate for vibration.

9. The apparatus according to claim 1, wherein the controller is configured to drive the first piezoelectric element with a first waveform that causes the first housing to vibrate against the second housing when the first housing is in the closed position and wherein the controller is configured to drive the first piezoelectric element with a second waveform that produces a louder audible signal than the first waveform.

10. The apparatus according to claim 1, wherein the first piezoelectric element breaks contact with the first housing when the first housing is in the open position, and wherein the first piezoelectric element does not cause the first housing to vibrate against the second housing when the first housing is in the open position when the controller drives the first piezoelectric element.

11. An apparatus comprising:

a first housing;

a speaker coupled to the first housing;

a hinge coupled to the first housing, the hinge including a cam mechanism;

a second housing coupled the first housing via the hinge, wherein the first housing has a closed position when the first housing is substantially adjacent to the second housing and the first housing has an open position when a portion of the first housing is substantially away from the second housing;

a microphone coupled to the second housing;

a first piezoelectric element coupled to the second housing, wherein the first piezoelectric element is substantially in contact with the first housing when the first housing is in the closed position;

a user interface coupled to the second housing; and a controller coupled to the first piezoelectric element and the user interface, the controller configured to drive the piezoelectric element to cause the first housing to vibrate against the second housing when the first housing is in the closed position and the controller is configured to drive the piezoelectric element to provide tactile feedback in response to user activation of the user interface.

12. The apparatus according to claim 11, wherein the controller is configured to drive the first piezoelectric element with a first waveform that causes the first housing to vibrate against the second housing when the first housing is in the closed position and wherein the controller is configured to drive the first piezoelectric element with a second waveform that has a longer waveform that produces a louder audible signal than the first waveform.

13. The apparatus according to claim 11, further comprising;

a first post coupled to the first housing and the first piezoelectric element when the first housing is in the closed position;

a second piezoelectric element coupled to the second housing; and a second post coupled to the first housing and the second piezoelectric element when the first housing is in the closed position, wherein the controller drives the second piezoelectric element in conjunction with the first piezoelectric element to cause the first housing to vibrate when the first housing is in the closed position.

14. The apparatus according to claim 11, wherein the controller is configured to detect a user input by detecting a dampening of oscillations of the first piezoelectric element in response to a user squeezing the first housing against the second housing.

15. The apparatus according to claim 14, wherein the controller is configured to change an alert mode by determining the dampened oscillations are the result of a user squeezing the first housing against the second housing.

16. The apparatus according to claim 11, further comprising an accelerometer coupled to the controller, wherein the accelerometer detects a magnitude of vibration or frequency of vibration of the first housing against the second housing, wherein the controller adjusts a parameter of operation of the apparatus based on the detected magnitude of vibration or frequency of vibration.

17. The apparatus according to claim 16, wherein the parameter of operation comprises an amplitude or a frequency of a signal driving the first piezoelectric element, wherein the controller increases an amplitude or adjusts a frequency of the signal driving the first piezoelectric element if the magnitude of vibration or the frequency of vibration is below a threshold.

18. The apparatus according to claim 16, wherein the parameter of operation comprises an alert mode, wherein the controller switches an alert mode to an audible alert mode if the magnitude of vibration is above a threshold.

19. The apparatus according to claim 16, wherein the controller is further configured to measure an amplitude of vibration or frequency of vibration and adjust a frequency of a signal driving the first piezoelectric element to increase the amplitude of vibration.

20. An apparatus comprising:

a first housing;

a hinge coupled to the first housing;

a second housing coupled the first housing via the hinge, wherein the first housing has a closed position when the first housing is substantially adjacent to the second housing and the first housing has an open position when a portion of the first housing is substantially away from the second housing;

a first piezoelectric element coupled to the second housing, wherein the first piezoelectric element is substantially in contact with the first housing when the first housing is in the closed position;

a second piezoelectric element coupled to the second housing;

a user interface coupled to the second housing; and a controller coupled to the first piezoelectric element and the user interface, the controller configured to drive the first piezoelectric element to cause the first housing to vibrate against the second housing when the first housing is in the closed position, the controller configured to drive the second piezoelectric element in conjunction with the first piezoelectric element to cause the first housing to vibrate when the first housing is in the closed position, and the controller configured to drive the first piezoelectric element to provide tactile feedback in response to user activation of the user interface.

* * * * *